Figure 1:
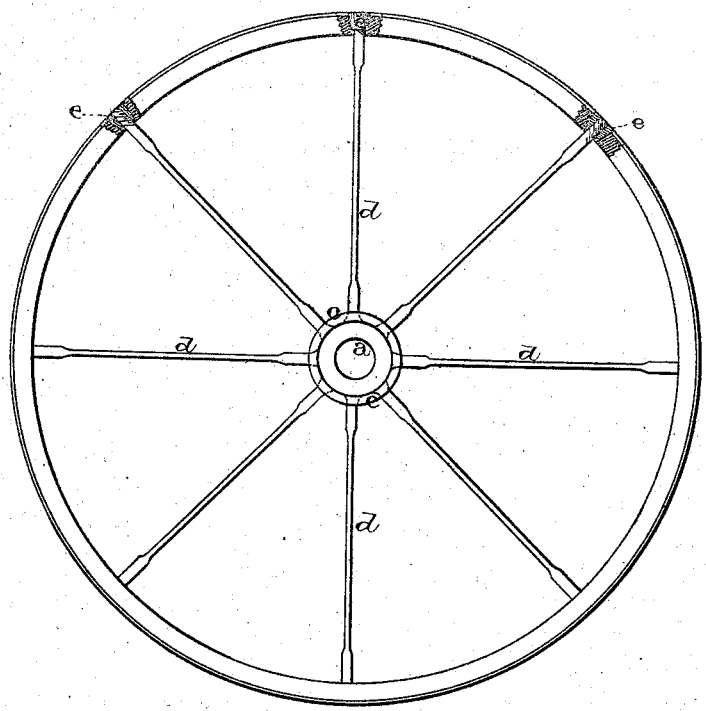
Figure 2:
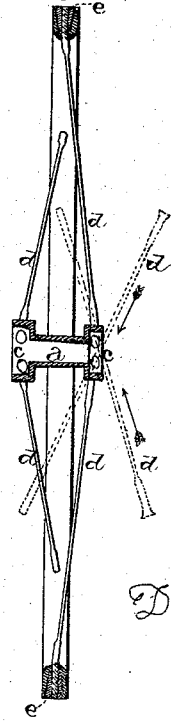

D. DIMMICK.
Vehicle Wheels.

No. 143,813. Patented Oct. 21, 1873.

WITNESSES.
F. A. Lehmann
Wm H Hale

INVENTOR.
Daniel Dimmick

UNITED STATES PATENT OFFICE.

DANIEL DIMMICK, OF ORWELL TOWNSHIP, BRADFORD COUNTY, PA.

IMPROVEMENT IN VEHICLE-WHEELS.

Specification forming part of Letters Patent No. 143,813, dated October 21, 1873; application filed October 2, 1873.

*To all whom it may concern:*

Be it known that I, DANIEL DIMMICK, of Orwell township, in the county of Bradford and State of Pennsylvania, have invented certain new and useful Improvements in Wheels for Vehicles; and I do hereby declare the following to be a full, clear, and exact description of the invention, such as will enable others skilled in the art to which it pertains to make and use it, reference being had to the accompanying drawings, which form part of this specification.

The nature of my invention relates to an improvement in wheels for vehicles; and it consists in, first, the manner of securing the spokes in the rim and hub; second, the construction of the hub itself.

The accompanying drawings represent my invention.

$a$ represents the hub, cast in one solid piece, so as to form both the hub and box. Upon each end of the hub is formed a flange, $c$, of sufficient width and thickness to allow the spokes $d$ to be passed upward through them, as shown, so that their outer ends can be fastened in the rim. The inner ends of the spokes have enlarged tapering heads, which catch in the flange, while the outer ends have screw-threads cut upon them, and are secured in the rim by means of the tapering recessed nuts $e$. By means of the flanges the spokes are secured in position by means of only a single fastening, thus decreasing the weight, cost, time, and trouble in constructing the wheel. Should one of them be broken, by loosening the nut in rim a new one can be inserted at very little cost of time or money. The central part of the hub, between the two flanges, is made as light and thin as is consistent with safety, having the inner flange made large enough to fit over the shoulder of the axle, while the outer one is just large enough to receive the burr or nut on the end of the axle. The spokes are placed staggering, and each one is made thicker at its ends where the strain comes than in the middle, so as to dispense with metal and the consequent weight.

A wheel constructed in this manner is very light and cheap, and is adapted for vehicles of all kinds and sizes, but especially so for light road wagons and sulkies.

I am aware that the spokes have heretofore been passed downward through the rim, and had their inner ends secured inside of the hub by means of nuts; but this manner of fastening them causes the hub to be made so large and heavy that the wheels cannot be used for light vehicles. By passing spokes up through the hub, and securing their outer ends in the rim, the hubs can be made very light and small.

Having thus described my invention, I claim—

The combination of the hub $a$, having the perforated flanges $c$, spokes $d$, and recessed nuts $e$ in the fellies, substantially as shown and described.

In testimony that I claim the foregoing I have hereunto set my hand this 2d day of October, 1873.

D. DIMMICK.

Witnesses:
F. A. LEHMANN,
WM. HALE.